United States Patent
Ray

(10) Patent No.: US 9,357,370 B2
(45) Date of Patent: *May 31, 2016

(54) SYSTEM AND METHOD FOR COMMUNICATING EMERGENCY INFORMATION THROUGH MESSAGING

(71) Applicant: CenturyLink Intellectual Property LLC, Denver, CO (US)

(72) Inventor: Amar Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,611

(22) Filed: Aug. 13, 2015

(65) Prior Publication Data
US 2015/0350864 A1 Dec. 3, 2015

Related U.S. Application Data

(63) Continuation of application No. 13/848,649, filed on Mar. 21, 2013, now Pat. No. 9,131,361, and a continuation of application No. 13/150,725, filed on Jun. 1, 2011, now abandoned, and a continuation-in-part of application No. 12/391,503, filed on Feb. 24, 2009.

(51) Int. Cl.
*H04W 4/22* (2009.01)
*H04M 1/725* (2006.01)
*H04L 12/58* (2006.01)
*H04W 4/02* (2009.01)
(Continued)

(52) U.S. Cl.
CPC ............... *H04W 4/22* (2013.01); *H04L 51/066* (2013.01); *H04M 1/72538* (2013.01); *H04M 1/72552* (2013.01); *H04W 4/02* (2013.01); *H04W 4/12* (2013.01); *H04W 4/18* (2013.01); *H04W 76/007* (2013.01); *H04L 12/1895* (2013.01)

(58) Field of Classification Search
CPC ........... H04W 4/02; H04W 4/18; H04W 4/22; H04W 12/12; H04W 76/007
USPC .................................. 455/404.1, 404.2, 456.1
See application file for complete search history.

(56) References Cited

U.S. PATENT DOCUMENTS 5,339,351 A 8/1994 Hoskinson et al.
5,379,337 A 1/1995 Castillo et al.
(Continued)

OTHER PUBLICATIONS

"AT&T Wireless Unleashes the First and Only Wireless Messaging Device," PhysOrg.com, Sep. 30, 2004; available online at URL: <http://www.physorg.com/news1392.html> ;12 pages.
(Continued)

*Primary Examiner* — Sam Bhattacharya
(74) *Attorney, Agent, or Firm* — Swanson & Bratschun, L.L.C.

(57) ABSTRACT

A system and method for communicating emergency messages. An emergency message is communicated wirelessly from a sending party is received. Location information associated with the sending party is determined. An emergency system associated with the sending party is determined utilizing the location information. A communication session is established with the emergency system. The emergency message is converted to an audio message in response to the communication session being established. The audio message is communicated to the emergency system in response to the communication session being established.

20 Claims, 4 Drawing Sheets

(51) Int. Cl.
*H04W 4/12* (2009.01)
*H04W 4/18* (2009.01)
*H04W 76/00* (2009.01)
*H04L 12/18* (2006.01)

(56) References Cited

U.S. PATENT DOCUMENTS

| | | |
|---|---|---|
| 5,497,149 A | 3/1996 | Fast |
| 5,555,286 A | 9/1996 | Tendler |
| 5,646,987 A | 7/1997 | Gerber et al. |
| 5,937,038 A | 8/1999 | Bell et al. |
| 6,137,877 A | 10/2000 | Robin et al. |
| 6,240,285 B1 | 5/2001 | Blum et al. |
| 6,317,049 B1 | 11/2001 | Toubia et al. |
| 6,366,772 B1 | 4/2002 | Arnson |
| 6,415,018 B1 | 7/2002 | Antonucci et al. |
| 6,480,578 B1 | 11/2002 | Allport |
| 6,526,125 B1 | 2/2003 | Lindsey et al. |
| 6,591,112 B1 | 7/2003 | Siccardo et al. |
| 6,642,844 B2 | 11/2003 | Montague |
| 6,678,357 B2 | 1/2004 | Stumer et al. |
| 6,690,932 B1 | 2/2004 | Barnier et al. |
| 6,771,163 B2 | 8/2004 | Linnett et al. |
| 6,839,022 B1 | 1/2005 | Benco et al. |
| 7,026,925 B2 | 4/2006 | Roche et al. |
| 7,079,627 B2 | 7/2006 | Crago et al. |
| 7,095,733 B1 | 8/2006 | Yarlagadda et al. |
| 7,098,787 B2 | 8/2006 | Miller |
| 7,231,218 B2 | 6/2007 | Diacakis et al. |
| 7,269,413 B2 | 9/2007 | Kraft |
| 7,342,917 B2 | 3/2008 | Mohan et al. |
| 7,386,103 B1 | 6/2008 | Chahal |
| 7,418,087 B2 | 8/2008 | Luneau et al. |
| 7,496,189 B2 | 2/2009 | Clarisse et al. |
| 7,574,194 B2 | 8/2009 | Yang et al. |
| 7,679,505 B1 | 3/2010 | Vallaire |
| 7,706,356 B1 | 4/2010 | Olshansky et al. |
| 7,734,019 B1 | 6/2010 | Terpstra |
| 7,773,975 B2 | 8/2010 | Snapp et al. |
| 7,843,903 B2 | 11/2010 | Bakke et al. |
| 7,920,679 B1 | 4/2011 | Naim et al. |
| 7,991,135 B2 | 8/2011 | Rauba et al. |
| 8,014,341 B1 | 9/2011 | Ray |
| 8,102,986 B1 | 1/2012 | McClintock et al. |
| 8,290,470 B2 | 10/2012 | Ray et al. |
| 8,295,801 B2 | 10/2012 | Ray et al. |
| 8,320,871 B2 | 11/2012 | Ray et al. |
| 8,364,113 B2 | 1/2013 | Ray et al. |
| 8,447,267 B2 | 5/2013 | Ray et al. |
| 8,615,214 B2 | 12/2013 | Jain et al. |
| 8,630,609 B2 | 1/2014 | Ray et al. |
| 8,712,366 B2 | 4/2014 | Greene et al. |
| 8,718,595 B2 | 5/2014 | Ray et al. |
| 8,891,749 B2 | 11/2014 | Geldbach et al. |
| 8,923,803 B2 | 12/2014 | Ray et al. |
| 8,964,945 B2 | 2/2015 | Ray |
| 8,976,938 B2 | 3/2015 | Zerillo et al. |
| 8,982,871 B2 | 3/2015 | Ray et al. |
| 9,025,734 B2 | 5/2015 | Ray et al. |
| 9,031,207 B2 | 5/2015 | Ray et al. |
| 9,131,361 B2 * | 9/2015 | Ray .................. H04L 51/066 |
| 9,179,280 B2 | 11/2015 | Ray et al. |
| 2001/0003843 A1 | 6/2001 | Scepanovic et al. |
| 2001/0004588 A1 | 6/2001 | Hong |
| 2001/0012379 A1 | 8/2001 | Amemiya et al. |
| 2002/0012323 A1 | 1/2002 | Petite et al. |
| 2002/0016189 A1 | 2/2002 | Sheynblat et al. |
| 2002/0054667 A1 | 5/2002 | Martinez |
| 2002/0136363 A1 | 9/2002 | Stumer et al. |
| 2003/0012344 A1 | 1/2003 | Agarwal et al. |
| 2003/0063714 A1 | 4/2003 | Stumer et al. |
| 2003/0109245 A1 | 6/2003 | McCalmont et al. |
| 2003/0133450 A1 | 7/2003 | Baum |
| 2003/0158668 A1 | 8/2003 | Anderson |
| 2004/0072583 A1 | 4/2004 | Weng |
| 2004/0077347 A1 | 4/2004 | Lauber et al. |
| 2004/0090950 A1 | 5/2004 | Lauber et al. |
| 2004/0176123 A1 | 9/2004 | Chin et al. |
| 2004/0257273 A1 | 12/2004 | Benco et al. |
| 2005/0002499 A1 | 1/2005 | Ordille et al. |
| 2005/0003797 A1 | 1/2005 | Baldwin |
| 2005/0070315 A1 | 3/2005 | Rai et al. |
| 2005/0101287 A1 | 5/2005 | Jin et al. |
| 2005/0111630 A1 | 5/2005 | Potorny et al. |
| 2005/0123102 A1 | 6/2005 | Beason et al. |
| 2005/0151642 A1 | 7/2005 | Tupler et al. |
| 2005/0159132 A1 | 7/2005 | Wright et al. |
| 2005/0169248 A1 | 8/2005 | Truesdale et al. |
| 2005/0197096 A1 | 9/2005 | Yang et al. |
| 2005/0201358 A1 | 9/2005 | Nelson et al. |
| 2005/0209781 A1 | 9/2005 | Anderson |
| 2005/0232225 A1 | 10/2005 | Pelaez et al. |
| 2005/0265326 A1 | 12/2005 | Laliberte |
| 2006/0009190 A1 | 1/2006 | Laliberte |
| 2006/0043164 A1 | 3/2006 | Dowling et al. |
| 2006/0052134 A1 | 3/2006 | Sato |
| 2006/0072547 A1 | 4/2006 | Florkey et al. |
| 2006/0133582 A1 | 6/2006 | McCulloch |
| 2006/0217136 A1 | 9/2006 | Bantukul et al. |
| 2006/0219542 A1 | 10/2006 | Savir |
| 2006/0234726 A1 | 10/2006 | Ashley et al. |
| 2006/0234727 A1 | 10/2006 | Ashley et al. |
| 2006/0293024 A1 | 12/2006 | Benco et al. |
| 2007/0003024 A1 | 1/2007 | Olivier et al. |
| 2007/0041368 A1 | 2/2007 | Lorello et al. |
| 2007/0064882 A1 | 3/2007 | Ger et al. |
| 2007/0121851 A1 | 5/2007 | Maropis et al. |
| 2007/0201391 A1 | 8/2007 | Belmonte et al. |
| 2007/0273519 A1 | 11/2007 | Ichikawa et al. |
| 2007/0280428 A1 | 12/2007 | McClelland |
| 2007/0287473 A1 | 12/2007 | Dupray |
| 2008/0018452 A1 | 1/2008 | McCarthy et al. |
| 2008/0026728 A1 | 1/2008 | Snapp et al. |
| 2008/0057944 A1 | 3/2008 | Miriyala et al. |
| 2008/0064363 A1 | 3/2008 | Salafia et al. |
| 2008/0064375 A1 | 3/2008 | Gottlieb |
| 2008/0070546 A1 | 3/2008 | Lee |
| 2008/0144779 A1 | 6/2008 | Ray et al. |
| 2008/0200143 A1 | 8/2008 | Qiu et al. |
| 2008/0261557 A1 | 10/2008 | Sim |
| 2008/0273670 A1 | 11/2008 | Dickinson |
| 2008/0304630 A1 | 12/2008 | Nguyen et al. |
| 2009/0047924 A1 | 2/2009 | Ray et al. |
| 2009/0086932 A1 | 4/2009 | Ray |
| 2009/0097474 A1 | 4/2009 | Ray et al. |
| 2009/0144260 A1 | 6/2009 | Bennett et al. |
| 2009/0186596 A1 | 7/2009 | Kaltsukis |
| 2009/0197567 A1 | 8/2009 | Ogram |
| 2009/0214011 A1 | 8/2009 | Geldbach et al. |
| 2009/0227225 A1 | 9/2009 | Mitchell et al. |
| 2009/0305730 A1 | 12/2009 | Herz et al. |
| 2009/0310602 A1 | 12/2009 | Olshansky et al. |
| 2010/0002845 A1 | 1/2010 | Zerillo et al. |
| 2010/0002846 A1 | 1/2010 | Ray et al. |
| 2010/0003946 A1 | 1/2010 | Ray et al. |
| 2010/0003947 A1 | 1/2010 | Ray et al. |
| 2010/0003949 A1 | 1/2010 | Ray et al. |
| 2010/0003954 A1 | 1/2010 | Ray et al. |
| 2010/0003955 A1 | 1/2010 | Ray et al. |
| 2010/0003961 A1 | 1/2010 | Ray et al. |
| 2010/0098062 A1 | 4/2010 | Croak et al. |
| 2010/0107192 A1 | 4/2010 | Sennett et al. |
| 2010/0142386 A1 | 6/2010 | Snapp et al. |
| 2010/0215153 A1 | 8/2010 | Ray et al. |
| 2010/0291894 A1 | 11/2010 | Pipes |
| 2011/0014923 A1 | 1/2011 | Krco et al. |
| 2011/0096769 A1 | 4/2011 | Sim |
| 2012/0214437 A1 | 8/2012 | Ray et al. |
| 2012/0309340 A1 | 12/2012 | Ray et al. |
| 2013/0012156 A1 | 1/2013 | Ray et al. |
| 2013/0059560 A1 | 3/2013 | Ray et al. |

(56) References Cited

U.S. PATENT DOCUMENTS

2013/0102269 A1  4/2013  Ray et al.
2013/0217355 A1  8/2013  Ray et al.
2013/0237181 A1  9/2013  Ray

OTHER PUBLICATIONS

"NENA Recommended Generic Standards for E9-1-1 PSAP Equipment" NENA Technical Reference, NENA-04-001 Issue 2, Mar. 2001; 105 pages.
Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003; 77 pages.
Dale N. Hatfield, "A Report on Technical and Operational Issues Impacting the Provision of Wireless Enhanced 911 Services," Federal Communications Commission, printed from the World Wide Web on May 8, 2006; 54 pages.
Dave Ryan & Asher Hazanchuk, "On-Hook & Off-Hook Caller ID Using DSP," Circuit Cellular INK# 83, Jun. 1997; 12 pages.
Federal Standard 1037C: Telecommunications: Glossary of Telecommunication Terms. National Communication System. Technology and Standards Division. Washington, DC: General Services Administration, Information Technology Service, 1996. pp. vii, A-28, H-7, O.
Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006; 2 pages.
Micro Engineering Labs, Inc., "Caller ID," Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006); 3 pages.
U.S. Appl. No. 11/640,714; Final Rejection dated Feb. 29, 2012; 17 pages.
U.S. Appl. No. 11/640,714; Non-Final Rejection dated Mar. 17, 2011; 15 pages.
U.S. Appl. No. 11/640,714; Non-Final Rejection dated Sep. 15, 2011; 15 pages.
U.S. Appl. No. 12/257,424; Final Rejection dated Jul. 14, 2011; 19 pages.
U.S. Appl. No. 12/257,424; Non-Final Rejection dated Mar. 4, 2011; 20 pages.
U.S. Appl. No. 11/430,232; Issue Notification dated Aug. 17, 2011; 1 page.
U.S. Appl. No. 11/430,232; Non-Final Rejection dated Jan. 19, 2011; 20 pages.
U.S. Appl. No. 11/430,232; Notice of Allowance dated May 13, 2011; 12 pages.
U.S. Appl. No. 11/640,714; Final Office Action dated Feb. 29, 2012; 17 pages.
U.S. Appl. No. 11/640,714; Issue Notification dated Apr. 22, 2015; 1 page.
U.S. Appl. No. 11/640,714; Non-Final Rejection dated May 29, 2014; 50 pages.
U.S. Appl. No. 11/640,714; Notice of Allowance dated Dec. 12, 2014; 41 pages.
U.S. Appl. No. 11/891,784; Final Rejection dated Jan. 3, 2011; 18 pages.
U.S. Appl. No. 11/891,784; Issue Notification dated Sep. 26, 2012; 1 page.
U.S. Appl. No. 11/891,784; Non-Final Rejection dated Aug. 3, 2010; 13 pages.
U.S. Appl. No. 11/891,784; Notice of Allowance dated Jul. 18, 2012; 27 pages.
U.S. Appl. No. 11/904,792; Final Office Action dated Dec. 2, 2011; 11 pages.
U.S. Appl. No. 11/904,883; Final Rejection dated Apr. 27, 2012; 16 pages.
U.S. Appl. No. 11/904,883; Final Rejection dated Jun. 10, 2014; 15 pages.
U.S. Appl. No. 11/904,883; Issue Notification dated Feb. 4, 2015; 1 page.
U.S. Appl. No. 11/904,883; Non Final Rejection dated Feb. 5, 2014; 19 pages.
U.S. Appl. No. 11/904,883; Non Final Rejection dated Oct. 11, 2012; 26 pages.
U.S. Appl. No. 11/904,883; Non Final Rejection dated Apr. 19, 2013; 22 pages.
U.S. Appl. No. 11/904,883; Non-Final Rejection dated Oct. 7, 2011; 19 pages.
U.S. Appl. No. 11/904,883; Notice of Allowance dated Oct. 8, 2014; 17 pages.
U.S. Appl. No. 11/974,775; Corrected Notice of Allowability dated Aug. 31, 2012; 7 pages.
U.S. Appl. No. 11/974,775; Issue Notification dated Sep. 26, 2012; 1 page.
U.S. Appl. No. 11/974,775; Non-Final Rejection dated May 10, 2011; 24 pages.
U.S. Appl. No. 11/974,775; Non-Final Rejection dated Nov. 7, 2011; 19 pages.
U.S. Appl. No. 11/974,775; Notice of Allowance dated Apr. 27, 2012; 12 pages.
U.S. Appl. No. 11/974,775; Notice of Allowance dated Jun. 12, 2012; 15 pages.
U.S. Appl. No. 12/070,909; Final Rejection dated Jan. 10, 2012; 9 pages.
U.S. Appl. No. 12/070,909; Issue Notification dated Oct. 29, 2014; 1 page.
U.S. Appl. No. 12/070,909; Non-Final Rejection dated Aug. 16, 2011; 13 pages.
U.S. Appl. No. 12/070,909; Notice of Allowance dated Jul. 23, 2014; 33 pages.
U.S. Appl. No. 12/168,668; Final Rejection dated Jul. 11, 2012; 29 pages.
U.S. Appl. No. 12/168,668; Issue Notification dated Feb. 18, 2015; 1 page.
U.S. Appl. No. 12/168,668; Non-Final Rejection dated Feb. 6, 2012; 21 pages.
U.S. Appl. No. 12/168,668; Notice of Allowance dated Oct. 7, 2014; 31 pages.
U.S. Appl. No. 12/195,607; Issue Notification dated May 2, 2012; 1 page.
U.S. Appl. No. 12/257,416; Non-Final Rejection dated Mar. 3, 2011; 22 pages.
U.S. Appl. No. 12/257,424; Final Rejection dated Jun. 13, 2012; 41 pages.
U.S. Appl. No. 12/257,424; Final Rejection dated Nov. 13, 2013; 34 pages.
U.S. Appl. No. 12/257,424; Issue Notification dated Dec. 10, 2014; 1 page.
U.S. Appl. No. 12/257,424; Non Final Office Action dated Jan. 31, 2012; 21 pages.
U.S. Appl. No. 12/257,424; Non-Final Rejection dated Apr. 17, 2014; 39 pages.
U.S. Appl. No. 12/257,424; Non-Final Rejection dated Jul. 8, 2013; 46 pages.
U.S. Appl. No. 12/257,424; Notice of Allowance dated Aug. 11, 2014; 36 pages.
U.S. Appl. No. 12/257,574; Final Rejection dated Dec. 29, 2011; 18 pages.
U.S. Appl. No. 12/257,574; Issue Notification dated Jan. 19, 2013; 1 page.
U.S. Appl. No. 12/257,574; Non-Final Rejection dated Jul. 6, 2011; 20 pages.
U.S. Appl. No. 12/257,574; Notice of Allowance dated Sep. 14, 2012; 25 pages.
U.S. Appl. No. 12/257,624; Final Office Action dated May 13, 2014; 28 pages.
U.S. Appl. No. 12/257,624; Final Rejection dated Jan. 31, 2012; 14 pages.

(56) References Cited

OTHER PUBLICATIONS

U.S. Appl. No. 12/257,624; Issue Notification dated Apr. 15, 2015; 1 page.
U.S. Appl. No. 12/257,624; Non-Final Rejection dated Oct. 6, 2011; 19 pages.
U.S. Appl. No. 12/257,624; Non-Final Rejection dated Oct. 16, 2013; 38 pages.
U.S. Appl. No. 12/257,624; Notice of Allowance dated Jan. 5, 2015; 18 pages.
U.S. Appl. No. 12/257,640; Non-Final Rejection dated Mar. 17, 2011; 21 pages.
U.S. Appl. No. 12/257,641; Issue Notification dated Nov. 7, 2012; 1 page.
U.S. Appl. No. 12/257,641; Non-Final Rejection dated May 24, 2011; 17 pages.
U.S. Appl. No. 12/257,641; Notice of Allowance dated Feb. 2, 2012; 12 pages.
U.S. Appl. No. 12/257,641; Notice of Allowance dated Aug. 2, 2012; 17 pages.
U.S. Appl. No. 12/257,655; Non-Final Rejection dated Apr. 1, 2011; 34 pages.
U.S. Appl. No. 12/257,862; Final Rejection dated Nov. 30, 2011; 15 pages.
U.S. Appl. No. 12/257,862; Issue Notification dated Apr. 9, 2014; 1 page.
U.S. Appl. No. 12/257,862; Non-Final Rejection dated Mar. 13, 2013; 30 pages.
U.S. Appl. No. 12/257,862; Non-Final Rejection dated May 24, 2011; 19 pages.
U.S. Appl. No. 12/257,862; Non-Final Rejection dated Aug. 23, 2013; 29 pages.
U.S. Appl. No. 12/257,862; Notice of Allowance dated Dec. 6, 2013; 21 pages.
U.S. Appl. No. 12/257,928; Issue Notification dated Jun. 25, 2014; 1 page.
U.S. Appl. No. 12/257,928; Non-Final Rejection dated Jun. 8, 2011; 21 pages.
U.S. Appl. No. 12/257,928; Non-Final Rejection dated Nov. 20, 2013; 35 pages.
U.S. Appl. No. 12/257,928; Notice of Allowance dated Mar. 6, 2014; 20 pages.
U.S. Appl. No. 12/272,238; Non-Final Rejection dated Mar. 28, 2011; 14 pages.
U.S. Appl. No. 12/272,238; Notice of Appeal and Pre-Brief Conference Request dated Dec. 28, 2011; 6 pages.
U.S. Appl. No. 12/272,238; Pre-Brief Appeal Conference Decision dated Jan. 17, 2012; 2 pages.
U.S. Appl. No. 12/272,238; Final Rejection dated Sep. 29, 2011; 12 pages.
U.S. Appl. No. 12/272,238; Issue Notification dated Oct. 3, 2012; 1 page.
U.S. Appl. No. 12/272,238; Notice of Allowance dated Jun. 8, 2012; 21 pages.
U.S. Appl. No. 12/391,503; Final Rejection dated May 24, 2012; 19 pages.
U.S. Appl. No. 12/391,503; Final Rejection dated Jun. 30, 2015; 22 pages.
U.S. Appl. No. 12/391,503; Final Rejection dated Jun. 5, 2014; 39 pages.
U.S. Appl. No. 12/391,503; Non Final Office Action dated Feb. 16, 2012; 9 pages.
U.S. Appl. No. 12/391,503; Non Final Office Action dated Jan. 22, 2015; 23 pages.
U.S. Appl. No. 12/391,503; Non Final Office Action dated Oct. 25, 2013; 23 pages.
U.S. Appl. No. 13/150,725; Non-Final Rejection dated Nov. 26, 2012; 19 pages.
U.S. Appl. No. 13/460,507; Final Rejection dated Dec. 20, 2012; 14 pages.
U.S. Appl. No. 13/460,507; Issue Notification dated Apr. 16, 2014.
U.S. Appl. No. 13/460,507; Non-Final Rejection dated Apr. 26, 2013; 19 pages.
U.S. Appl. No. 13/460,507; Non-Final Rejection dated Aug. 16, 2012; 28 pages.
U.S. Appl. No. 13/460,507; Notice of Allowance dated Dec. 20, 2013; 20 pages.
U.S. Appl. No. 13/612,558; Issue Notification dated Feb. 25, 2015; 1 page.
U.S. Appl. No. 13/612,558; Non-Final Rejection dated Apr. 14, 2014; 37 pages.
U.S. Appl. No. 13/612,558; Notice of Allowance dated Sep. 16, 2014; 16 pages.
U.S. Appl. No. 13/614,585; Issue Notification dated May 1, 2013; 1 page.
U.S. Appl. No. 13/614,585; Notice of Allowance dated Dec. 11, 2012; 30 pages.
U.S. Appl. No. 13/715,808; Issue Notification dated Dec. 24, 2013; 1 page.
U.S. Appl. No. 13/715,808; Non-Final Rejection dated Apr. 9, 2013; 36 pages.
U.S. Appl. No. 13/715,808; Notice of Allowance dated Sep. 13, 2013; 27 pages.
U.S. Appl. No. 13/847,388; Final Rejection dated Dec. 4, 2014; 39 pages.
U.S. Appl. No. 13/847,388; Final Rejection dated Apr. 7, 2014; 36 pages.
U.S. Appl. No. 13/847,388; Issue Notification dated Oct. 14, 2015; 1 page.
U.S. Appl. No. 13/847,388; Non-Final Office Action dated Jul. 17, 2013; 54 pages.
U.S. Appl. No. 13/847,388; Non-Final Office Action dated Dec. 9, 2013; 34 pages.
U.S. Appl. No. 13/847,388; Non-Final Rejection dated Jul. 17, 2014; 39 pages.
U.S. Appl. No. 13/847,388; Notice of Allowance dated Mar. 20, 2015; 33 pages.
U.S. Appl. No. 13/847,388; Notice of Allowance dated Jun. 23, 2015; 29 pages.
U.S. Appl. No. 13/848,649; Issue Notification dated Aug. 19, 2015; 1 page.
U.S. Appl. No. 13/848,649; Non-Final Rejection dated Dec. 29, 2014; 12 pages.
U.S. Appl. No. 13/848,649; Non-Final Rejection dated Jul. 17, 2014; 21 pages.
U.S. Appl. No. 13/848,649; Notice of Allowance dated May 4, 2015; 15 pages.
U.S. Appl. No. 12/391,503; Non Final Rejection dated Jan. 15, 2016; 23 pages.

* cited by examiner

SYSTEM AND METHOD FOR COMMUNICATING EMERGENCY INFORMATION THROUGH MESSAGING

CROSS-REFERENCE TO RELATED APPLICATIONS

This application is a continuation of U.S. patent application Ser. No. 13/848,649 ('649) filed Mar. 21, 2013 by Amar Ray and titled, "System and Method for Communicating Emergency Information through Messaging" which is a continuation of U.S. patent application Ser. No. 13/150,725 ('725), filed Jun. 1, 2011, by Amar Ray and entitled, "System and Method for Communicating Emergency Information through Messaging." This application is also a continuation-in-part of U.S. patent application Ser. No. 12/391,503 ('503), filed Feb. 24, 2009 by Amar N. Ray et al. and entitled, "System and Method for Establishing Pre-Stored Emergency Messages," which is hereby incorporated by reference in its entirety. This application also is related to U.S. patent application Ser. No. 12/257,574, filed Oct. 24, 2008 by Amar Nath Ray et al. and entitled, "Data Message Service Controller and Method for Handling Emergency Text Messaging," the entire teachings of which are incorporated herein by reference.

BACKGROUND

The use of and development of communications has grown nearly exponentially in recent years. The growth is fueled by larger networks with more reliable protocols and better communications hardware available to service providers and consumers. In particular, many younger individuals use wireless message and other new forms of communication almost exclusively. Emergency services as well as the associated networks, systems, protocols, and devices have struggled to keep pace with this rapid development. As a result, emergency services are mostly limited to traditional forms of communication and have failed to keep pace with the younger generation and new technologies.

SUMMARY

One embodiment includes a system and method for communicating emergency messages. An emergency message may be communicated wirelessly from a sending party is received. Location information associated with the sending party may be determined. An emergency system associated with the sending party may be determined utilizing the location information. A communication session may be established with the emergency system. The emergency message may be converted to an audio message in response to the communication session being established. The audio message may be communicated to the emergency system in response to the communication session being established.

Another embodiment includes a system for communicating emergency text messages. The system may include a wireless network operable to receive text messages from a number of wireless devices including a sending party. The system may also include a conversion device in communication with the wireless network operable to receive the text messages, identify a text message as an emergency message, establish a communications session with an emergency system, and convert the emergency message to an audio message in response to the communication session being established. The emergency system may be in communication with the conversion device. The emergency system may play the audio message received from the conversion device to emergency personnel.

Yet another embodiment includes a conversion device for emergency communications. The conversion device may include a processor for executing a set of instructions and a memory for storing the set of instructions. The set of instructions may be executed to receive an emergency message communicated wirelessly from a sending party, establishing a communications session with an emergency system in response to determining the emergency system is associated with the sending party utilizing the location information, convert the emergency message to an audio message in response to the communication session being established, and communicate the audio message to the emergency system in response to the communication session being established.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system and method for providing emergency services and communications through messaging. An emergency message, such as a text message to 911, is identified and communicated to a conversion device. The message is converted into an audio message once the communications session or path is determined. Location information sent with the original message is utilized to determine a nearest or most appropriate emergency service access point, system, and personnel as well as the exact or approximate location of the person sending the emergency message. The audio message may be played to emergency service personnel as if the message were a traditional 911 call. The message may also be transmitted, displayed, or otherwise communicated via email, text, or other interface to the systems and devices accessible by the emergency service personnel.

As a result, the emergency service personnel are notified of an emergency through a message and existing emergency service communications, networks, standards, and protocols may be utilized with little modification. Confirmation and response messages may be sent back to the sending party to provide confirmation that the message was received, provide emergency instructions, or to provide other information that may be needed by the sending party. The described systems and methods may function with legacy systems, networks, gateways, and components to facilitate emergency text messages without a complete modification or replacement of emergency systems. The systems and methods described may utilize any of the systems, standards, and protocols of the National Emergency Number Association (NENA) and Next Generation 911 (NG911), such as NENA-i3 which are herein incorporated by reference.

Figure 1:
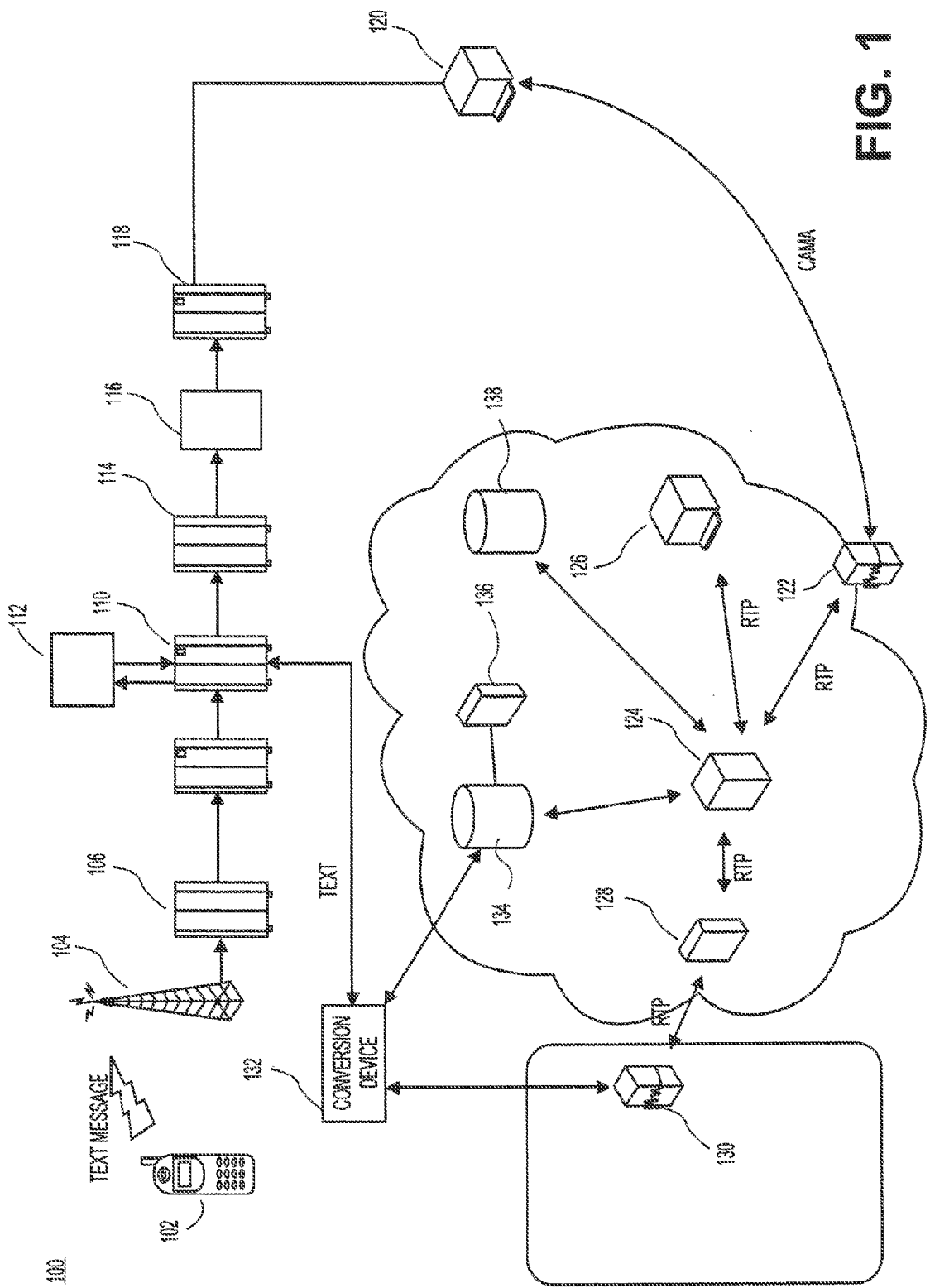
FIG. 1 is a pictorial representation of a communications environment in accordance with an illustrative embodiment.

FIG. 1 is a pictorial representation of a communications environment 100 in accordance with an illustrative embodiment. The communications environment may 100 include any number of devices, networks, systems, and connections an example of which are illustrated in FIG. 1. In one embodiment, the illustrative embodiments may utilized the legacy 911 calling systems, emergency service internet protocol network, and corresponding procedures with minor modifications or additions to achieve emergency communications as described. The communications environment 100 is one embodiment of all or portion of an emergency service internet protocol network (ESINet). The communications environment 100 may include legacy networks including wireless and wireline communications components configured for 911 communications as well as more advanced Internet protocol (IP) components.

In one embodiment, the communications environment 100 may include a wireless device 102, a cell site 104, a mobile switching center (MSC) 106, an originating Short Messaging Service Controller (SMSC) 108, a SMSC router 110, a database 112, an SS7 clearing house 114, an SS7 network 116, an SMSC terminal 118, a Public Safety Answering Position (PSAP) 120, an legacy public safety answering position gateway (LPG) 122, an Emergency Service Routing Proxy (ESRP) 124, a Network Gateway (NG) Public Safety Answering Position 126, a Border Control Function (BCF) 128, a Legacy Network Gateway (LNG) 130, a conversion device 132, a database 134, a location information server (LIS) 136, and a Geo Information Server (GIS) 138.

The SS7 clearing house 114 and the SS7 network 116 may be utilized for standard emergency communications, voice communications, and text communications between different parties. The illustrative embodiments provide the benefit of working with standard communications systems and emergency communications systems without requiring expensive or overly burdensome network renovations and protocol updates.

The illustrative embodiments may be performed for a message sent wirelessly. In one embodiment, the message is a text message with text content. In other embodiments, the message may be an audio, video, chat, or other message recorded or streamed in real time with the content of the message varying accordingly.

The wireless device 102 is a communications or computing device enabled for wireless communications. The systems, components, and devices of the communications environment 100 may communicate utilizing any number of wireless and hardwired communications mediums, standards, and protocols known in the art. For example, the wireless device 102 may communicate with the cell tower 104 utilizing any number of cellular and data standards, such as CDMA, EV-DO, GSM, GRSM, WiMax, 4G, and other existing or developing standards and protocols. The other components may communicate through networks and connections, such as Ethernet networks communicating through fiber optics.

In addition, the components of the communications environment 100 may be incorporated in one or more devices, programs, applications, or devices. For example, the roles of various devices may be implemented by hardwired digital logic, programmable gate arrays, or based on the execution of software that is stored in one or more memories and executed by one or more processors. In addition, each of the devices of the communications environment 100 may include processing elements, memories, caches, motherboards, communications and peripheral interfaces, busses, logic, and other components that are not specifically shown or described, but that are known in the art.

The wireless device 102 may execute an application or operating system that is operable to implement specific steps, instructions, or features in response to identifying a text message as an emergency message. In one embodiment, the wireless device enters an emergency mode in response to an identifier, such as "911", "emergency", or "help" being entered as the recipient of the call. In particular, the wireless device 102 may identify the message as an emergency message with the wireless device then providing the MSC 106 with location information including the content of the message. The location information may be determined utilizing global positioning information (GPS) obtained by the wireless device, utilizing wireless triangulation, or other location determination methodologies. In one embodiment, the location information may include a latitude and longitude. In another embodiment, the location information may include an address if known.

In another embodiment, the MSC 106, originating SMSC or conversion device 132 may identify the message as an emergency message and associate location information with the emergency message. The user information including the call back number of the caller (calling, sending, or originating party), the location information, and content of the message may be communicated from the MSC 106 to the legacy network gateway 130 via the originating SMSC 108 the SMSC router 110 and the conversion device 132. In one embodiment, the user information is an automatic number identification (ANI) and the original location information that is received by the legacy network gateway 130.

The conversion device 132 may be an audio multi-purpose conversion box (MPCB) that converts the text or other content to audio content that may be played, displayed, or otherwise communicated to a user or emergency service personnel and vice versa. In one embodiment, the conversion device 132 may only perform the conversion or play the converted message once a communications session or path is established with the appropriate PSAP, such as PSAP 120. The conversion device 132 may convert or process data to a local media as may be appropriate or required for public safety related cases, such as emergency communications related to evacuations or mass notifications.

In some situations, the conversion device 132 may be unable to establish a communications session with a PSAP, such as PSAP 120. It is possible in some worst case scenarios that a whole region of PSAPs may be unavailable, non-functionally, or unstaffed due to particular emergencies, such as earthquakes, hurricanes, power outages, or other natural or man-made disasters. If the conversion device 132 determines no PSAPs are available based on communications with the ESRP, the conversion device 132 may send a message to the wireless device 102 indicating that the message was not delivered. The determination that the PSAPs are not available may be made in response to a confirmation of an off-hook message not being received from the PSAP, inability to establish a communications session, or other potential issue.

In one embodiment, the conversion device 132 may convert texting abbreviations, symbols, or slang to the equivalent language. The conversion device 132 may access one or more databases or logic engines to translate or make a best guess of the intended language. For example, "pls" would be converted to "please", "hry" may be converted to "hurry", and "ASAP" may be converted to "as soon as possible." Signal initiating protocol (SIP) may be utilized to complete a call from the conversion device 132 to the PSAP 126. For example, the message may not be delivered to the PSAP 126 until the SIP signaling is completed with the PSAP going off-hook to initiate a communications session and receive a call from the conversion device 132. The PSAPs 126 and 120 represent IP or analog systems.

The conversion device 132 may also send the automatic number identification and location information to the database 134. The database 134 may communicate with or be integrated with the location information server 136. In one embodiment, the conversion device 132 may receive a location value indicating the exact location of the wireless device 102, such that a query or look up in the database 134 and the location information server 136 is not required. As a result, the location value may be passed along by the conversion device 132 and the legacy network gateway to the ESRP 124 for selection of an appropriate PSAP and other communications routing. In another embodiment, the location information server 136 may determine the exact address or other location information associated with the originally received location information.

In one embodiment, the database 134 may communicate with third party devices, web portals, or enterprise solutions to manually or automatically determine the location information associated with the user. In one embodiment, the database 134 may communicate with a validation database updated through a portal or other automated solution to retrieve applicable location information.

The conversion device 132 may send an automatic number identification to the legacy network gateway 130. The conversion device 13 may also send the unformatted location information or any other type of identification that may be utilized to identify the sending party and perform a location query from the required for the location query by the ESRP 124. The conversion device 132 may also be enabled to format communications to an IP or SIP format. For example, the conversion device 132 may communicate the ANI utilizing the SIP format to the legacy network gateway 130. Any number of other formats may also be utilized for communications within the communications environment 100.

The legacy network gateway 130 may be a signaling and media interconnection point between callers in legacy wireline/wireless originating networks and the emergency architecture (e.g. i3, i4) so that PSAPs are enabled to receive emergency calls from legacy networks. Although, not shown, the legacy network gateway 130 may also communicate with a DMS, ISDN, class 5 or proxy switches or other similar communications devices and systems. The legacy network gateway 130 may pass the automatic number identification to the emergency service routing proxy 124 through the border control function 128. The border control function 128 may provide a secure entry into an emergency service internet protocol network. The border control function 128 may incorporate firewall, admission control, and session and media anchoring and well as security mechanisms to prevent deliberate or malicious attacks on PSAPs or other entities contained in the communications environment 100.

The emergency service routing proxy 124 may be a functional component, such as a SIP proxy server that selects the next hop routing within the ESINet based on location and policy. In one embodiment, there is an emergency service routing proxy on the edge of the ESINet and potentially at the entrance to a next generation PSAP. There may also be any number of intermediate emergency service routing proxies between endpoints. The emergency service routing proxy 124 may query the location information server 136 for location information based on the automatic number identification and retrieve the location information (e.g. an address corresponding to the sending party) back in return. In one embodiment, the location information server 136 has the address or location information prepared beforehand based on the communication from the conversion device 132.

The emergency service routing proxy 124 may also obtain routing information from the emergency call routing function (ECRF) of the geo information server 138 using the location to service translation (LoST) protocol. The emergency service routing proxy 124 may route the call to the appropriate PSAP using the emergency call routing function, location validation function, (LVF), and LoST. The conversion from TDM PSAP to IP PSAP may take some time. During the transition period, the emergency service routing proxy 124 may deliver 911 traffic to the existing TDM PSAPs through the legacy PSAP gateway 122. The emergency service routing proxy 124 may also deliver the IP-911 traffic to the IP host client through appropriate network connections (e.g. ESINet). The legacy PSAP gateway 122 may also be a TDM gateway which represents a PSAP gateway for a legacy PSAP that uses TDM signaling rather than IP. The legacy PSAP gateway 122 may eventually be replaced during ESINet upgrades to a carrier or PSAP based on the configuration of the ESINet.

The PSAP 126 may obtain the location information of the user (e.g. 911 caller) in any number of ways including from the ESRP 124 in PIDF format, from a query to the location information server 136 based on the uniform resource identifier (URI) to obtain the location of the calling party, and from a query to the geo information server 138.

The location information server 136 is a functional entity that provides locations of endpoints. A location information server 136 may provide location-by-reference or location-by-value in geo or civic forms. The location information server 136 may be queried by an endpoint for its own location or by another entity of the location of an endpoint. The location information server 136 may receive a unique identifier that represents the endpoint, such as an IP address, circuit identification or MAC address and returns the location (value or reference) associated with the identifier. The location information server 136 may also provide a dereferencing service by exchanging a location reference for a location value.

One or more of the devices of the communications environment 100 may utilize a location validation function to ensure that a civic address retrieved by the database 134 or location information server 134 is valid. The location validation function supports validation of addresses against a geospatial database. The location information server 136 and the database 134 may be located inside the local emergency network or outside the emergency network of the communications environment 100. The communication between the ESRP 124 and the location information server 136 may occur through ESINet or through the existing ALI communicating network via an appropriate gateway and firewall system.

The emergency call routing function supports calls and associated data being relayed or transferred between states and across the country. The emergency call routing function may utilize standards of service, management, resources, and functionality to ensure that emergency services are available uniformly. In one embodiment, the emergency call routing function receives location information (i.e. civic address or geo-coordinates) as input and uses this information to provide a Uniform Resource Identifier (URI) that may be used to route an emergency call toward the PSAP corresponding to the calling party's location. Depending on the identity and credentials of the component, entity, or individual requesting the routing information, the response may identify the PSAP, or emergency service routing proxy that acts on behalf of the PSAP to provide final routing to the PSAP itself. The same database that is used to route a call to the correct PSAP may also be used to subsequently route the call to the correct responder (e.g. to support selective transfer capabilities).

The emergency service routing proxy 124 may send the location information in a Presence Information Data Format-Location Object (PIDF-LO) encapsulated in a session initiation protocol (SIP) packet utilizing routing information received from the emergency call routing function to the PSAP 126. The PSAP 126 may unbundle the SIP packet to retrieve the location information and format the location information. For example, the SIP packet may convert latitude and longitude information into a location address. The location information may also be obtained by accessing the Geo Information Server 138 using the LoST protocol.

If the PSAP 126 utilizes TDM (e.g. legacy gateway) the legacy PSAP gateway 122 converts from the SIP format to Central Automatic Message Accounting (CAMA) before delivering the message to the PSAP 120. Upon the SIP signaling being established between the conversion device 132 and the PSAP 120, the conversion device 132 may send the audio message to the PSAP 120. The conversion device 132 may send a confirmation message to the wireless device 102 indicating that the emergency message was sent and received. In one embodiment, the confirmation message is a text message. Alternatively, the confirmation message may be a phone call, email, or displayed message that is sent and displayed through an application, program or instructions utilized or synchronized between the conversion device 132 and the wireless device 102. The conversion device 132 may also send a message to the PSAP 120 indicating the original message was created by the wireless device 102 utilizing text messaging.

The PSAP 120 may reply with an audio message that is automatically generated or received from emergency personnel. In one embodiment, the response message is sent via RTP traffic as far as the legacy network gateway 130. The legacy network gateway 130 may convert the traffic to TDM format (e.g. CAMA) before sending the response message to the conversion device 132. The conversion device 132 may convert the audio to text before sending the response message to the wireless device 102 and corresponding sending party in one or more messages. The conversion device 132 may partition the response message according to the protocol and standard limitations as well as industry practices (ie. a maximum of 160 characters). The illustrative embodiments may utilize known emergency communications processes for further initiating, setting up, and tearing down a communication session.

Figure 2:
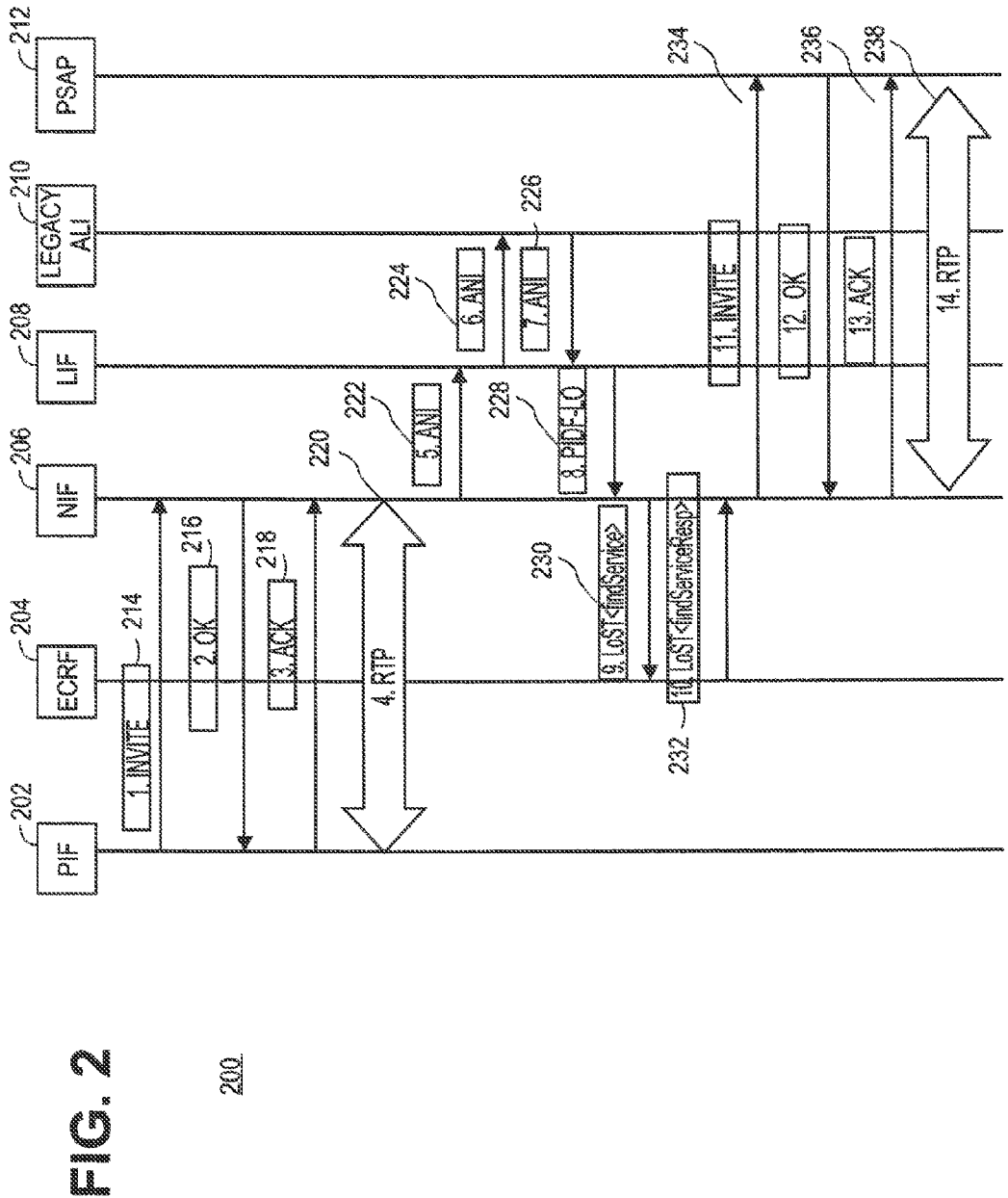
FIG. 2 is a vector diagram for emergency communications in accordance with an illustrative embodiment.

FIG. 2 is a vector diagram for emergency communications in accordance with an illustrative embodiment. The process of FIG. 2 may be implemented by the communications environment 100 of FIG. 1. The process of FIG. 2 may be implemented between a protocol interworking function (PIF) 202, emergency call routing function (ECRF) 204, an network interworking function (NIF) 206, a location interworking function (LIF) 208, a legacy Automatic Location Identification (ALI) 210, and a public safety answering point (PSAP) 212. In one embodiment, the process of FIG. 2 may be implemented in the communications environment 100 of FIG. 1.

The process may begin with the protocol interworking function 202 sending an invite to the network interworking function 206 (step 214). The protocol interworking function 202 may represent a legacy network gateway. The network interworking function 206 may represent an application server or ESRP within a data center or other facility. A confirmation message is sent back from the network interworking function 206 to the protocol interworking function 202 (step 216) and the protocol interworking function 202 then responds with an acknowledgement (step 218).

As a result, a real-time transport session is established between the protocol interworking function 202 and network interworking function 206 (step 220). Next, the network interworking function 206 sends the automatic number identification to the location interworking function 208 (step 222) and the location interworking function 208 send the automatic number identification to the legacy Automatic Location Identification 210 (step 224). The location interworking function 208 may represent a function performed by an application server of the ESRP that is responsible for making a query to the location information server and receiving back the location information. The legacy Automatic Location Identification 210 sends the automatic location identification to the location interworking function 208 (step 226). The location interworking function 208 sends a PIDF to the network interworking function 206 (step 228). The network interworking function 206 submits a LoST query to the emergency call routing function 204 (step 230). The emergency call routing function 204 fulfills the query and responds with the LoST response to the network interworking function 206 (step 232).

Next, the network interworking function 206 sends an invitation to a public safety answering point (212). The public safety answering point 212 represents a public safety answering point applicable to the user address. A confirmation message is sent back from the public safety answering point 212 to the network interworking function 206 (step 216) and the network interworking function 206 then responds with an acknowledgement to the public safety answering point 212 (step 236). As a result, an RTP session is established between the network interworking function 206 and the public safety answering point 212 to communicate the message as well as the location information.

Figure 3:
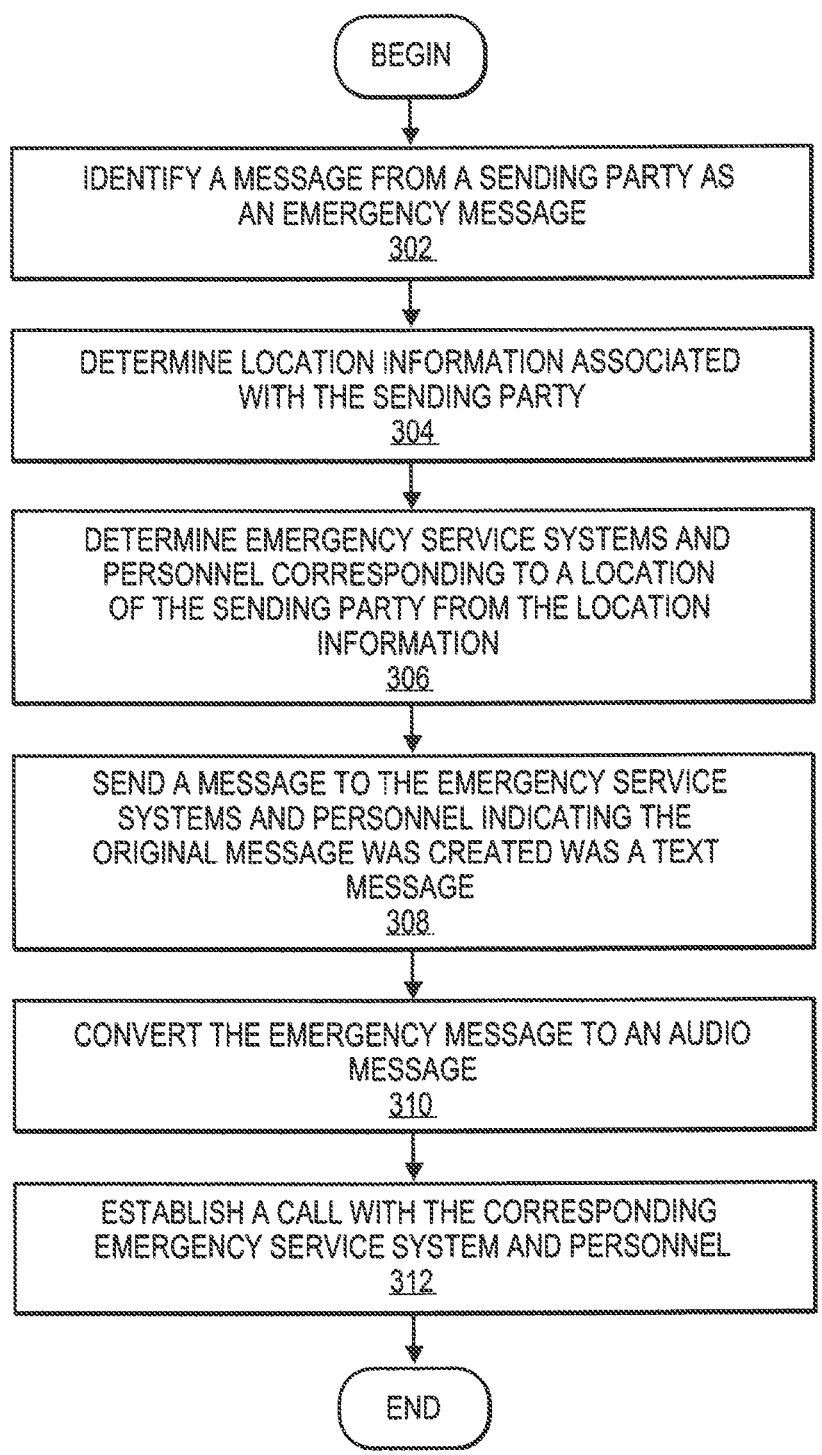
FIG. 3 is a flowchart of a process for communicating emergency messages in accordance with an illustrative embodiment.

FIG. 3 is a flowchart of a process for communicating emergency messages in accordance with an illustrative embodiment. The process of FIGS. 3 and 4 may be implemented by a communications system or environment. The process may begin by identifying a message from a sending party as an emergency message (step 302). The message maybe identified as an emergency message based on the designated recipient, number, or other identifier. For example, common recipients for a text message may include 911, fire, police, medical emergency, search and rescue, coast guard, and so forth. In one embodiment, the emergency service systems and personnel may be pre-programmed into the wireless device as part of the functionality of the phone or based on a legal requirement.

Next, the system determines location information associated with the sending party (step 304). In one embodiment, a location information server/database may be accessed by a component of the system, such as an emergency services routing proxy, to determine an address of the user. The location information server may utilize original location information received in the message or determined by a MSC. In one embodiment, the location information may automatically be included or embedded in the message in response to a wireless device determining the message is an emergency message. For example, a cell phone may utilize GPS, wireless triangulation, or proximity detection to determine exact or approximate location information which may include a specific address. In another embodiment, subsequent messages, confirmations, or details are streamed from the wireless device indicating the location. If a location of the sending party is unknown and not easily determined, a last known location may be listed or sent indicating that was the last known address.

Next, the system determines emergency service systems and personnel corresponding to a location of the sending party from the location information (step 306). In one embodiment, the location information may be utilized to determine the nearest responding party. The responding party may be indicated by designated boundaries, maps, and other thresholds that the location information is mapped to or compared against. In some cases, a particular type of emergency or situation may mean that a particular emergency service system and personnel are notified. For example, if the sending party is in a wilderness area, the message may be routed to the nearest search and rescue department rather than the local police or fire department. Keywords or a designated recipient may be utilized to determine where and how the emergency message is routed and the applicable system and personnel for receiving the emergency message. For example, the term "fire" may ensure that the emergency message is routed to the nearest fire department, the term "gun" and an indicate "police" recipient may ensure that the message to the nearest police department.

Next, the system sends a message to the emergency service systems an personnel indicating the original message was created from a text message (step 308). The message may be an email, call, displayed message, or other indicator that indicates the original message was a text message. The message of step 318 may be utilized to reassure the emergency personnel as to why an automated message is being received. Otherwise, the emergency service personnel may think the real emergency message was a fake.

Next, the system establishes a call with the corresponding emergency service system and personnel (step 310). The call or communications of the flowchart of FIG. 3 may involve establishing a communications path, real-time protocol, session initiation protocol, automatic number identification, CAMA, LoST, and other applicable systems and protocols. The call or communications path/session may be generated such that traditional 911 emergency calling systems may be utilized. During step 312, the audio message including the content of the emergency message and the location information may be sent to the designated emergency service system and personnel (e.g. PSAP).

Next, the system converts the emergency message to an audio message (step 312). The audio message may utilize a text-to-voice conversion process or engine. The audio message may include the content from the original message as well as the location information. The conversion may utilized a database to convert abbreviations, acronyms, slang, or other languages to a language used by emergency service personnel. In an alternative embodiment, the system may convert the emergency message to the audio message ahead of time so that the message may be immediately played to the emergency service system and personnel once the call/session is established.

Figure 4:
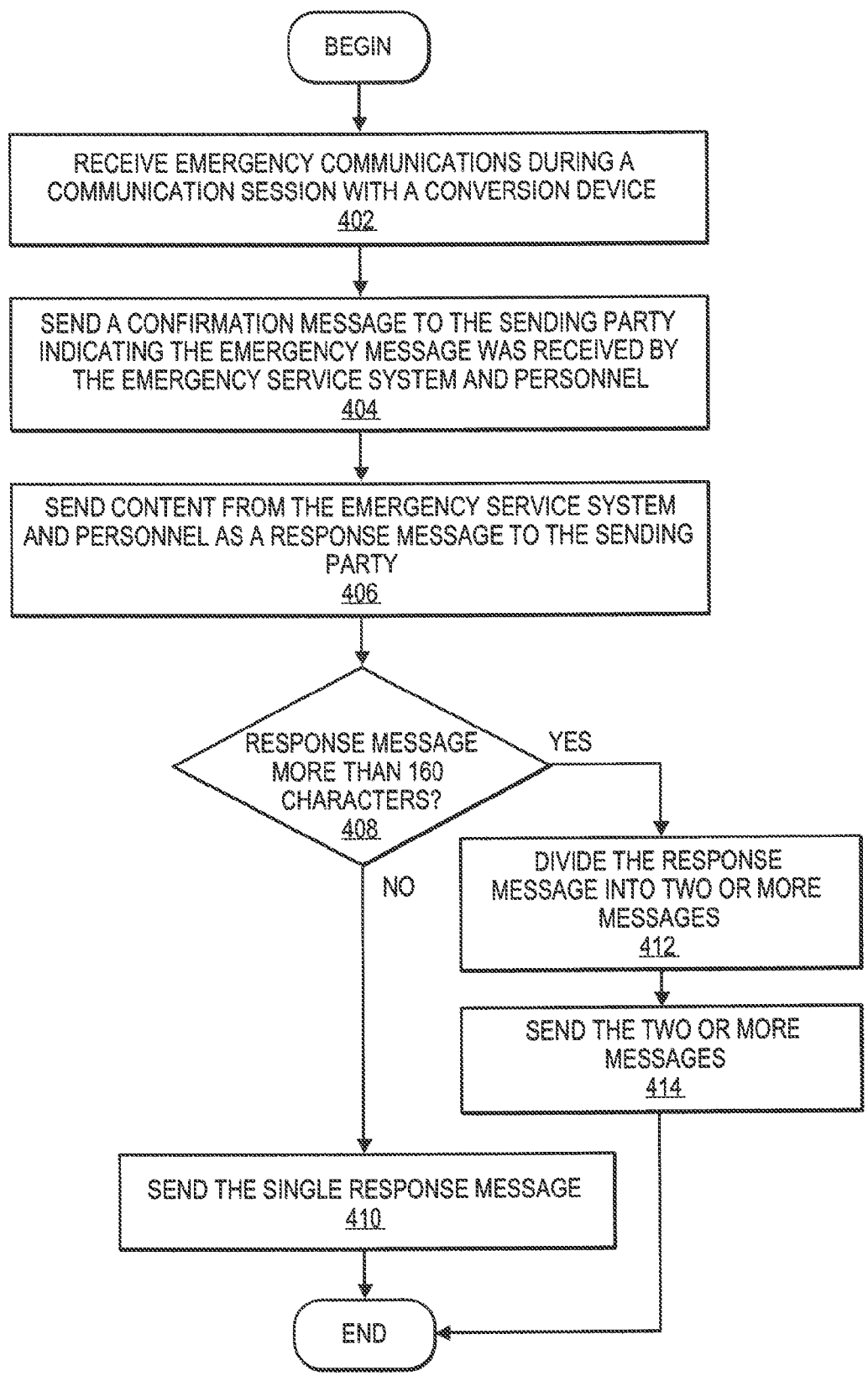
FIG. 4 is a flowchart of a process for communicating return messages to a sending party in accordance with an illustrative embodiment.

FIG. 4 is a flowchart of a process for communicating return messages to a sending party in accordance with an illustrative embodiment. The process of FIGS. 3 and 4 may occur sequentially or may partially overlap. The process of FIG. 4 may begin by receiving emergency communications during a communication session with a conversion device (step 402). During step 402, an audio file of a converted message, such as a text message, may be played, displayed, recorded, or otherwise communicated to the emergency service system and personnel. The communication session may be a call RTP session or other end-to-end or intermediate communications.

Next, the system sends a confirmation message to the sending party indicating the emergency message was received by the emergency services system and personnel (step 404). The message may be displayed to the sending party's device to reassure the person experiencing or observing the message that the message was received. For example, the confirmation message may be a text message indicating the system or personnel responding to the emergency, location, contact information, and time and date the emergency message received the original message.

Next, the system sends content from the emergency service system and personnel as a response message to the sending party (step 406). In one embodiment, the response message is an audio response (i.e. voice communications from a 911 operator) that is converted to a text message. Alternatively, the emergency service system may utilize a text message system available through a computing or communications device integrated with the emergency service system to send the message. The phone number and applicable domain for the service provider may be utilized to send an email that is converted into a text message (i.e. phone number @vtext.com, @tmomail.com, Next, the system determines whether the response message is more than 160 characters (step 408). The threshold or level of step 408 may represent any number applicable to a particular type of communication, standard, or messaging. Texting or communications standards or protocols may set limits on the number of characters, information, or format that may be included into the message. The system formats the content to the applicable messaging standard, format, and capacity.

If the response message does not exceed the 160 characters, the system sends the single response message (step 410). The message may include instructions for dealing with the emergency, information about the emergency response, requests for additional details, or other communication information common for emergency response situations.

If the response message exceeds the limitations of the message protocol, the system divides the response message into two or more messages (step 412). For example, some messages are limited to 160 characters and therefore multiple messages may be required to send the verbal or text content. For example, a 200 character message may be broken into a first message of 160 characters and a second message of 40 characters.

Next, the systems sends the two or messages (step 414). The two or more messages may be sent simultaneously or with a slight delay between and according to the applicable messaging protocol.

The previous detailed description is of a small number of embodiments for implementing the invention and is not intended to be limiting in scope. The following claims set forth a number of the embodiments of the invention disclosed with greater particularity.

What is claimed is:

1. A method for communicating emergency messages, the method comprising:
   receiving an emergency message communicated wirelessly from a sending party;
   establishing a communications session with the emergency system;
   converting the emergency message to an audio message in response to establishing the communications session; and
   communicating the audio message to the emergency system in response to the communication session being established.

2. The method according to claim 1, wherein the emergency message is a text message, and wherein the communications session is performed utilizing a SIP format.

3. The method according to claim 2, further comprising:
determining a message is the emergency message;
sending a message to the emergency system indicating that the message was originally a text message.

4. The method according to claim 3, wherein the determining is performed utilizing an identifier for the receiving party.

5. The method according to claim 1 further comprising:
determining location information associated with the sending party;
determining an emergency system associated with the sending party utilizing the location information, wherein the location information is global positioning information including a latitude and longitude determined by a wireless device utilized by the sending party.

6. The method according to claim 5, wherein the location information is wireless triangulation information determined by a wireless device utilized by the sending party.

7. The method according to claim 2, further comprising:
sending a message received through the emergency system to the receiving party.

8. The method according to claim 7, wherein the sending comprises:
converting speech from emergency personnel into one or more text messages that are communicated to the receiving party.

9. The method according to claim 1, further comprising:
automatically sending a confirmation message to the sending party indicating the emergency message has been received in response to the emergency system receiving the audio message; and
automatically sending a message to the sending party indicating the emergency message has not been received in response to failure to establish the communication session.

10. The method according to claim 7, wherein the message is one or more text messages, the one or more text messages comply with applicable character limitations.

11. A system for communicating emergency text messages, the system comprising:
a wireless network operable to receive text messages from a plurality of wireless devices including a sending party;
a conversion device in communication with the wireless network operable to receive the text messages, identify a text message as an emergency message, establish a communications session with an emergency system, and convert the emergency message to an audio message in response to establishing the communications session.

12. The system according to claim 11, further comprising:
one or more databases operable to determine the emergency system corresponding to a location of the sending party for establishing the communication session with the emergency system and determine a location of the sending party utilizing location information in the emergency message associate location information for the sending party with the emergency message.

13. The system according to claim 11, wherein the conversion device sends a confirmation message indicating that the text message was received by the emergency personnel, wherein the conversion device sends a message to the emergency system indicating that the emergency message was originally the text message, and wherein the conversion device converts a response message from the emergency personnel to one or more text messages according to character limitations.

14. The system according to claim 11, wherein the communication session includes a call to play the audio content, and wherein a portion of the communications session is performed utilizing the SIP format.

15. The system according to claim 11, wherein the emergency system includes legacy systems for processing 911 calls.

16. A conversion device for emergency communications comprising:
a processor for executing a set of instructions; and
a memory for storing the set of instructions, wherein the set of instructions are executed to:
receive an emergency message communicated wirelessly from a sending party;
convert the emergency message to an audio message in response to establishing the communication session; and
communicate the audio message to the emergency system in response to the communication session being established.

17. The conversion device according to claim 16 wherein the set of instructions are further executed to:
determine location information associated with the sending party;
establish a communications session with an emergency system in response to determining the emergency system is associated with the sending party utilizing the location information, and wherein the emergency system is associated with the sending party in response to the emergency system covering an area corresponding to the location information.

18. The conversion device according to claim 16, wherein the emergency system is associated with the sending party in response to an identifier indicating the receiving party in the emergency message.

19. The conversion device according to claim 18, wherein the emergency message is a text message, wherein the conversion device determines the text message is an emergency message utilizing the identifier.

20. The conversion device according to claim 16, wherein the set of instructions are further executed to:
automatically send a confirmation message to the sending party indicating the emergency message has been received in response to the emergency system receiving the audio message;
automatically send a message to the sending party indicating the emergency message has not been received in response to failure to establish the communication session; and
convert a response message from emergency personnel received from the emergency system to one or more text messages according to character limitations.

* * * * *